(12) United States Patent
Morgan et al.

(10) Patent No.: US 8,758,167 B2
(45) Date of Patent: Jun. 24, 2014

(54) COMPOSITIONS FOR GOLF BALLS BASED ON ORIENTED NANOSTRUCTURES

(75) Inventors: William E. Morgan, Barrington, RI (US); Brian Comeau, Berkley, MA (US); Michael J. Sullivan, Barrington, RI (US)

(73) Assignee: Acushnet Company, Fairhaven, MA (US)

( * ) Notice: Subject to any disclaimer, the term of this patent is extended or adjusted under 35 U.S.C. 154(b) by 309 days.

(21) Appl. No.: 13/233,112

(22) Filed: Sep. 15, 2011

(65) Prior Publication Data
US 2013/0072322 A1    Mar. 21, 2013

(51) Int. Cl.
A63B 37/06   (2006.01)
A63B 37/12   (2006.01)

(52) U.S. Cl.
USPC ........... 473/370; 473/371; 473/373; 473/374; 473/376; 473/377

(58) Field of Classification Search
USPC ................................................. 473/351–378
See application file for complete search history.

(56) References Cited

U.S. PATENT DOCUMENTS

| | | | |
|---|---|---|---|
| 3,572,721 A * | 3/1971 | Harrison et al. | 473/373 |
| 3,572,722 A * | 3/1971 | Harrison et al. | 473/377 |
| 4,955,966 A * | 9/1990 | Yuki et al. | 473/359 |
| 5,952,415 A * | 9/1999 | Hwang | 524/399 |
| 6,203,450 B1 * | 3/2001 | Bradley et al. | 473/351 |
| 6,454,666 B1 | 9/2002 | Shira | |
| 6,525,141 B2 * | 2/2003 | Kataoka | 525/261 |
| 6,642,314 B2 | 11/2003 | Sone et al. | |
| 6,689,469 B2 | 2/2004 | Wang et al. | |
| 6,794,447 B1 | 9/2004 | Kim et al. | |
| 6,802,784 B2 | 10/2004 | Sullivan et al. | |
| 6,872,785 B2 | 3/2005 | Wang et al. | |
| 6,875,818 B2 | 4/2005 | Wang | |
| 6,919,395 B2 * | 7/2005 | Rajagopalan et al. | 524/432 |
| 7,205,370 B2 | 4/2007 | Wang et al. | |
| 7,220,191 B2 * | 5/2007 | Onoda et al. | 473/351 |
| 7,238,751 B2 | 7/2007 | Wang et al. | |
| 7,261,647 B2 | 8/2007 | Sullivan et al. | |
| 7,294,069 B2 | 11/2007 | Isogawa et al. | |
| 7,469,734 B2 | 12/2008 | Zuigyou | |
| 7,544,740 B2 | 6/2009 | Wang et al. | |
| 7,553,909 B2 | 6/2009 | Wang et al. | |
| 7,659,342 B2 | 2/2010 | Wang et al. | |
| 7,662,313 B2 | 2/2010 | Whiteford et al. | |
| 7,722,480 B2 | 5/2010 | Shindo et al. | |
| 8,267,808 B2 * | 9/2012 | De La Cruz et al. | 473/345 |
| 2007/0191526 A1 | 8/2007 | Jordan et al. | |
| 2010/0160530 A1 | 6/2010 | Kurazumi et al. | |

OTHER PUBLICATIONS

Maryam Jahanshahi "Driving Ambition: How Nanotechnology is Changing Golf", Materials Australia, vol. 41-No. 2, May 2008, p. 19-21.

* cited by examiner

Primary Examiner — Alvin Hunter
(74) Attorney, Agent, or Firm — Daniel W. Sullivan

(57) ABSTRACT

Multi-piece golf balls having at least one component made of a rubber composition comprising substantially oriented nanostructures are provided. For example, the nanostructures may be in the form of nanofibers, nanorods, nanotubes, and nanoparticles. The multi-piece golf ball contains a core, which may have a dual-core construction including a center and surrounding outer core layer or other multi-layered structure. Preferably at least one of the core layers is formed from a polybutadiene rubber composition comprising the nanostructures. The polybutadiene rubber may be chemically or non-chemically modified. The polybutadiene preferably has a cis-bond content of at least 80%.

17 Claims, 2 Drawing Sheets

COMPOSITIONS FOR GOLF BALLS BASED ON ORIENTED NANOSTRUCTURES

BACKGROUND OF THE INVENTION

1. Field of the Invention

The present invention generally relates to multi-piece golf balls and more particularly to golf balls having at least one component made of a composition comprising an oriented nanostructure. The multi-piece golf ball includes a core, which may be constructed of a center and surrounding outer core layer. Preferably at least one of the core layers is formed from a composition comprising a rubber material and the oriented nano structure. The golf ball further includes a cover, which may be a dual-cover having inner and outer cover layers.

2. Brief Review of the Related Art

Today, both professional and amateur golfers use multi-piece solid golf balls. Basically, a two-piece solid golf ball includes a solid inner core protected by an outer cover. The inner core is made commonly of a rubber material such as natural and synthetic rubbers: styrene butadiene, polybutadiene, or polyisoprene. Highly neutralized ethylene acid copolymer ionomer resins (HNPs) also may be used to form the core. The outer cover is made commonly of thermoplastic or thermoset resins such as ionomers, polyolefins, polyamides, polyesters, polyurethanes, and polyureas. As new materials and manufacturing processes have become more economically feasible, three-piece, four-piece, and five-piece solid golf balls have been introduced. Different materials are used in the golf ball construction to impart specific properties and playing features to the ball.

For example, the resiliency and rebounding performance of a golf ball is based primarily on its core. Balls having a high resiliency tend to reach a high velocity when struck by a golf club. As a result, the ball tends to travel a greater distance. This helps the ball travel longer distances. In a majority of golf balls used today, conventional cores comprise polybutadiene rubber ("PBR"). The core construction may be single or multi-layered. That is, the golf ball may include a single core layer (center). In another version, the golf ball may have a dual-core construction comprising an inner core and at least one surrounding core layer. In yet another version, the golf ball may contain a multi-layered core comprising an inner core, intermediate core layer, and outer core layer. The PBR compositions typically contain "fillers," which are added to adjust the density and/or specific gravity of the material. Adjusting the weight of the golf ball either towards the center or outer surface of the ball changes the flight and spin characteristics of the ball.

The industry continues to look at new materials, for example, nano-sized materials such as nanofibers, nanotubes, and nanoparticles that could be used in constructing golf ball components. Kim et al., U.S. Pat. No. 6,794,447 discloses golf balls incorporating nanofiller material in their cores, outer cover layers, or, intermediate layers. The material includes a polymer such as polyamide, ionomer, polycarbonate, polyurethane, polystyrene, polyethylene, fluoropolymer, polyamide elastomer, thermoplastic polyolefin, polyester elastomer, polyester, polyolefin, thermoplastic elastomer, thermoplastic vulcanizate, or epoxy resin. Nano-particles of inorganic material are dispersed in the polymeric material. The particles have a size of one micron ($\mu m$) or smaller and particles preferably consist essentially of clay, such as hydrotalcite, montmorillonite, micafluoride, or octosilicate.

Jordan et al., US Patent Application Publication US 2007/0191526 discloses golf balls having a core and cover surrounding the core. At lest one of the layers is formed from a composition comprising nano-clays and a fully neutralized ethylene acid copolymer or other ionomer resin. The acid groups in the ionomer resin may be neutralized by a salt of an organic acid, a cation source, or a suitable base. The nano-clays are described as being high aspect ratio additives typically based on montmorillonite clay. The nano-clays preferably have a 50% average dry particle size of 6 $\mu m$ or less and a 10% average dry particle size of 2 $\mu m$ or less with a preferred aspect ratio of 100 to 150.

Sullivan et al., U.S. Pat. No. 7,261,647 discloses golf balls having a core, vapor barrier layer, and cover. The barrier layer is formed from a polymer comprising a nano-material s such as smectite minerals; carbon nanotubes; fullerenes; single-wall and multi-wall carbon nanotubes; polymer nanofibers; and carbon nanofibrils with an average particle size of less than 100 nm. According to Sullivan '647, the nano-material creates a tortuous path across the barrier layer to prevent vapor from penetrating therein. Suitable polymers are described as including ionomeric copolymers and terpolymers, thermoplastic elastomers, polybutadiene rubber, balata, grafted metallocene-catalyzed polymers, polyurethanes, and polyureas.

Isogawa et al., U.S. Pat. No. 7,294,069 discloses a golf ball having a core and cover layer. The resin composition used to form the cover layer contains a base resin and cation-treated phillosilicate in the form of nano-sized fine particles. The primary particles have a thickness of 10 nm or smaller, and are in the shape of flat plates having a length and a width of 1 nm or smaller. The '069 patent describes polyurethanes, ionomers, polyamides, polyesters, polyolefins, polystyrene-based elastomers, and mixtures thereof as being suitable base resins.

One drawback with adding nanostructures is that such fillers are generally difficult to disperse in the composition. The very small size of the particles makes them hard to disperse. As a result, agglomerates of particles may faun in the polymeric matrix. If a significant amount of agglomerates and aggregates form, they may negatively affect physical properties such as modulus and hardness. Because of this poor dispersibility, the desired levels of hardness and modulus may not be achieved when using such nanostructures.

It would be desirable to have a rubber composition containing nanostructures that could be used to make a core for a golf ball, wherein the nanostructures are dispersed highly throughout the composition. The nanostructures, for example, particles, tubes, or fibers, should be dispersed homogenously to prevent or minimize the tendency of particles to stick together and form aggregates. Also, good dispersion is important, because it means the material can be molded more easily into a golf ball core or other ball component.

The present invention provides golf ball cores and other ball components made from rubber compositions containing nanostructures. The nanostructures are homogenously dispersed in the rubber compositions, thus providing the material with good physical properties. In turn, the rubber compositions can be molded into components for golf balls. The resulting golf ball has high quality playing performance.

SUMMARY OF THE INVENTION

The present invention provides a multi-piece golf ball comprising a core having at least one layer and a cover having at least one layer. At least one layer of the core is formed of a composition comprising: i) a rubber material; and ii) 0.1 to 5 parts by weight peroxide free-radical initiator; iii) 5 to 50 parts by weight cross-linking co-agent; and v) 0.1 to 30 parts by weight of substantially oriented nanostructures based on 100 parts of rubber material. The substantially oriented nanostructures are preferably selected from the group consisting of nanofibers, nanorods, nanotubes, and nanoparticles. In one particularly preferred version, nanoparticles having an average particle size of 100 nm or less are used in the composition. There is good interaction between the polybutadiene rubber and nanostructures allowing the nanostructures to be dispersed homogenously throughout the composition and minimizing the build-up of clusters and aggregates.

Preferably, the rubber material comprises a chemically-modified polybutadiene rubber. The polybutadiene rubber may be formed by reacting the polybutadiene with a chemical moieties such as, for example, alkoxysilanes, three-membered heterocycles including oxiranes, azirdines and thioxiranes; carboxylic acids, esters and salts, alcohols, isocyanates, thiols, sulfides, and anhydrides. In one preferred version, the modified polybutadiene preferably has a cis-content of at least 80%, more preferably at least 90%, and even more preferably at least 97%. The rubber composition preferably comprises about 5 to about 50% by weight modified polybutadiene rubber and about 50 to about 95% by weight non-chemically-modified polybutadiene rubber. The composition also may contain filler materials that are not substantially oriented nanostructures. These filler materials include, for example, polymeric or mineral fillers, metal fillers, metal alloy fillers, metal oxide fillers and carbonaceous fillers.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description in connection with the accompanying drawings in which:

DETAILED DESCRIPTION OF THE INVENTION

Figure 1:
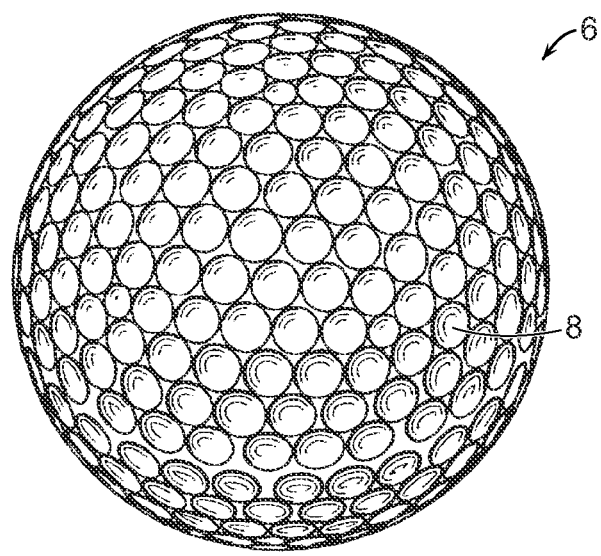
FIG. 1 is a front view of a golf ball having a dimpled cover made in accordance with the present invention.

The present invention relates generally to golf balls containing at least one component made from a composition comprising substantially oriented nanostructures. Preferably, at least one of the core layers in the golf ball is formed from a composition comprising the nanostructures and polybutadiene rubber (chemically or non-chemically modified).

Golf balls having various constructions may be made in accordance with this invention. For example, golf balls having two-piece, three-piece, four-piece, and five-piece constructions may be made. In general, the balls include a core protected by a surrounding cover. The core and cover may be single or multi-layered. The term, "layer" as used herein means generally any spherical portion of the golf ball. More particularly, in one version, a three-piece golf ball comprising a "dual-core" and cover is made. In another version, a four-piece golf ball comprising a dual-core and "dual-cover" is made. The dual-core includes an inner core (center) and surrounding outer core layer. The dual-cover includes inner cover and outer cover layers. In yet another construction, a five-piece golf ball having a dual-core, intermediate layer, and dual-cover is made. As used herein, the term, "intermediate layer" means a layer of the ball disposed between the core and cover. The intermediate layer may be considered an outer core layer, or inner cover layer, or any other layer disposed between the inner core and outer cover of the ball. The intermediate layer also may be referred to as a casing or mantle layer. In accordance with the present invention, at least one of the core, intermediate, and cover layers of the golf ball is formed from the composition of this invention. The diameter and thickness of the different layers along with properties such as hardness and compression may vary depending upon the construction and desired playing performance properties of the golf ball.

Polybutadiene Rubber

The golf ball may contain a single- or multi-layered core. In one preferred embodiment, at least one of the core layers is formed of a rubber composition comprising polybutadiene rubber material. More particularly, in one version, the ball contains a single core formed of the polybutadiene rubber composition. In a second version, the ball contains a dual-core comprising an inner core (center) and surrounding outer core layer. In yet another version, the golf ball contains a multi-layered core comprising an inner core, intermediate core layer, and outer core layer.

In general, polybutadiene is a homopolymer of 1,3-butadiene. The double bonds in the 1,3-butadiene monomer are coordinated by catalysts to grow the polymer chain and form a polybutadiene polymer having a desired molecular weight and microstructure. Any suitable catalyst may be used to synthesize the polybutadiene rubber depending upon the desired properties. Normally, a transition metal complex (for example, neodymium, nickel, or cobalt) or an alkyl metal such as alkyllithium is used as a catalyst. Other catalysts include, but are not limited to, aluminum, boron, lithium, titanium, and combinations thereof. Metallocene-catalyzed polybutadiene rubber also may be used. The catalysts produce polybutadiene rubbers having different chemical structures. In a cis-bond configuration, the main internal polymer chain of the polybutadiene appears on the same side of the carbon-carbon double bond contained in the polybutadiene. In a trans-bond configuration, the main internal polymer chain is on opposite sides of the internal carbon-carbon double bond in the polybutadiene. In a vinyl structure, the carbon-carbon double bond is pendant to the main polymer backbone. The polybutadiene rubber can have various combinations of cis- and trans-bond and vinyl structures. A preferred polybutadiene rubber has a 1,4 cis-bond content of at least 40%, preferably greater than 80%, and more preferably greater than 90%, and most preferably greater than 97%. In general, polybutadiene rubbers having a high 1,4 cis-bond content have high tensile strength.

The polybutadiene rubber may be chemically-modified to impart specific properties to the rubber material. For example, the active chain ends of the polybutadiene may be modified with a functional group to improve dispersion of the fillers in the rubber material. The functional groups may provide enhanced interaction between the polymer and fillers. In one embodiment, the polybutadiene rubber may be chemically-modified in situ immediately following the polymerization reaction. Alternatively, the polybutadiene rubber may be chemically-modified post-polymerization after the rubber has been removed and isolated from the reaction medium.

The chemical moieties used to modify the polybutadiene rubber include, for example, alkoxysilanes, three-membered heterocycles including oxiranes, azirdines and thioxiranes; carboxylic acids, esters and salts, alcohols, isocyanates, thiols, sulfides, and anhydrides. The chemical-modifiers also may contain a halogenated site that can be used to react the terminal ends of the polymer chain. The post-polymerization modification may be carried out through free-radical grafting of the desired chemical moiety to the polybutadiene chain. Active free-radical sinks may include unsaturated compounds or sulfur-containing compounds. Active free-radical sources such as peroxides, azo initiators, or photoinitiators may be necessary to facilitate the reaction. Examples of some suitable chemically-modified polybutadiene rubber materials, which can be used in accordance with the present invention, are described in Kurazumi et al., U.S. Patent Application Publication US 2010/0160530, the disclosure of which is hereby incorporated by reference.

Examples of commercially-available chemically-modified and non-chemically-modified polybutadiene rubbers that can be used in accordance with this invention, include, but are not limited to, BR 01 and BR 1220, available from BST Elastomers of Bangkok, Thailand; SE BR 1220LA and SE BR1203, available from DOW Chemical Co of Midland, Mich.; BUDENE 1207, 1207s, 1208, and 1280 available from Goodyear, Inc of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, CB1220, and CB 1221, available from Lanxess Corp. of Pittsburgh. Pa.; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEOCIS BR 60, FNTENE 60 AF and P30AF, and EUROPRENE BR HV80, available from Polimeri Europa of Rome, Italy; AFDENE 50 and NEODENE BR40, BR45, BR50 and BR60, available from Karbochem (PTY) Ltd. of Bruma, South Africa; KBR 01, NdBr 40, NdBR-45, NdBr 60, KBR 710S, KBR 710H, and KBR 750, available from Kumho Petrochemical Co., Ltd. Of Seoul, South Korea; DIENE 55NF, 70AC, and 320 AC, available from Firestone Polymers of Akron, Ohio; and PBR-Nd Group II and Group III, available from Nizhnekamskneftekhim, Inc. of Nizhnekamsk, Tartarstan Republic.

Blends of chemically-modified and non-chemically-modified polybutadiene rubbers may be prepared and used in accordance with this invention. For example, the chemically-modified polybutadiene may be used in an amount within a range of about 5% to about 95%, and the non-chemically-modified polybutadiene may be used in an amount within a range of about 95% to about 5%. More particularly, the amount of chemically-modified polybutadiene may be within a range of about 20% to about 80% and the non-chemically-modified polybutadiene may be within a range of about 80% to about 20%. In one preferred embodiment, the chemically-modified polybutadiene is used in an amount within a range of about 5% to about 50%; and the non-chemically-modified polybutadiene is used in an amount within a range of about 5% to about 50%.

Substantially Oriented Nanostructures

In accordance with this invention, the rubber composition further contains substantially oriented nanostructures. As discussed further below, it is anticipated the modulus, hardness, and durability properties of the rubber compositions will be improved when the nanostructures are blended therein. As used herein, the term, "nanostructures" refers to structures having at least one region or characteristic dimension with a dimension of less than 500 nm, for example, less than 200 nm, less than 100 nm, less than 50 nm, or even less than 20 nm. Typically, the region or characteristic dimension will be along the smallest axis of the structure. Examples of such structures include various spherical, ovoid, elongated or branched structures, including, but not limited to, nanocrystals, nanowires, nanofibers, nanorods, nanotubes, branched nanowires, nanotetrapods, nanotripods, nanobipods, nanodots, quantum dots, nanoparticles, nanoribbons, and/or the like. Nanostructures can be substantially homogeneous in material properties, or in certain embodiments can be heterogeneous (for example, heterostructures). Optionally, a nanostructure can comprise one or more surface ligands (for example, surfactants). The nanostructure is optionally substantially single crystal in structure (a "single crystal nanostructure" or a "mono-crystalline nanostructure").

The term, "substantially oriented nanostructures" as used herein refers to sets or clusters of nanostructures in which at least 10%, at least 25%, at least 50%, at least 75%, at least 90% or more of the member nanostructures are oriented or positioned relative to a designated axis, plane, surface or three dimensional space. The orientation or positioning can be, for example, substantially parallel, substantially perpendicular, or at a selected angle (for example, about 15°, 30°, 45°, or 60°.). Substantially oriented nanostructures include, for example, sets of splayed or angularly-gathered sets of nanostructures (for example, star patterns or hexagonal groupings) as well as substantially aligned populations of nanostructures. Suitable examples of substantially oriented nanostructures that may be used in the rubber compositions of this invention are described in Whiteford et al., U.S. Pat. No. 7,662,313, the disclosure of which is hereby incorporated by reference.

The substantially oriented nanostructures are generally divided into three categories: organic, inorganic, and metallic, all of which are suitable for use in the rubber compositions of this invention. In the present invention, the nanostructures are able to interact and be compatible with the surrounding polymer in the rubber materials, particularly the chemically-modified polybutadiene. The nanostructures are effectively dispersed in the polymeric matrix. In the present invention, the nanostructures are generally more compatible with the polymer matrix so they tend to be spread out evenly. The nanostructures do not tend to stick together and form aggregates. The nanostructures are more homogenously dispersed throughout the matrix. One benefit of this dispersion mechanism is that the nanostructures could have a significant effect on the properties of the composition at relatively low concentrations. The compositions also may have a cost benefit and be more economically advantageous, because a lesser amount of nanostructures may be added to the composition. Adding a relatively small amount of nanostructures is possible, because the nanostructures, which are added, can be uniformly and highly dispersed throughout the composition.

Preferably, the nano-particles have particle sizes ranging from about 0.9 nm up to 100 nm in diameter and an aspect ratio of about 100 to about 1000; a surface area of at least about 100 $m^2/g$, more preferably at least about 250 $m^2/g$; and most preferably at least about 500 $m^2/g$.

Other conventional nanostructure materials may be used in the rubber compositions of this invention. For example, nano-particles having a poly(alkenylbenzene) core and a surface layer comprising a crystalline polyolefin as disclosed in Wang et al., U.S. Pat. No. 6,689,469; multi-layer nano-particles having a multi-block polymeric core made up of poly(alkenylbenzene) and at least two additional layers formed of divergent monomers or of the same monomers used in the core as disclosed in Wang et al, U.S. Pat. No. 6,872,785; polymer nano-strings having a poly(alkenylbenzene) core and a surface layer comprising poly(conjugated diene) as disclosed in Wang, U.S. Pat. No. 6,875,818; flower-like nanoparticles having a poly(alkenylbenzene) core and a poly(conjugated diene) or a poly(alkylene) surface layer as disclosed in Wang et al., U.S. Pat. No. 7,205,370; and multi-layer nanoparticles having a poly(alkenylbenzene) core and at least two additional layers, wherein the nano-particles are modified via hydrogenation or functionalization as disclosed in Wang et al., U.S. Pat. No. 7,238,751, each of the disclosures which is hereby incorporated by reference, may be used in accordance with this invention.

Other suitable nanostructures include, for example: cross-linked nano-particles that are produced by adding a cross-linking agent to micelles formed of a living block copolymer chain as disclosed in Wang et al., U.S. Pat. No. 7,544,740; nano-particles having a shell and polar core as disclosed in Wang et al., U.S. Pat. No. 7,659,342; and polymeric nanoparticles having at least three layers, wherein the first layer is formed of polymerized alkenylbenzene monomers and the second and third layers comprise at least one monomer selected from conjugated dienes, alkenylbenzenes, alkylenes, ethylene oxide, methyl methacrylates, nitriles, and acrylates as disclosed in Wang et al., U.S. Pat. No. 7,553,909, each of the disclosures which is hereby incorporated by reference.

The rubber composition of this invention may be used to form a core component for a golf ball as discussed further below. The interactions and compatibility of the nanostructures with the polymeric matrix can cause advantageous property changes in the compositions. Particularly, the modulus, hardness, and durability properties of the rubber compositions should be improved when the nanostructures are blended therein. The nanostructures create a reinforcing network in the rubber matrix such that the layers of the golf ball made from this material have greater modulus and hardness over layers made from materials that do not contain such nanostructures. That is, the rubber composition, which does not contain any nanostructures, has a first modulus and first hardness. The rubber composition, which contains the nanostructures, has a second modulus and second hardness. The second modulus and second hardness are greater than the first modulus and first hardness as described further below.

In general, increasing the hardness of the core causes the resiliency of the core to increase. The compression of the core also increases. The cores of this invention have good durability, toughness, and impact strength. Moreover, the cores maintain their firmness and other physical properties over time. The core constructions of this invention could be manufactured efficiently; have relatively low material costs; and provide the ball with high quality playing performance properties. In particular, the core should provide the ball with good flight distance, which is particularly desirable when hitting the ball off the tee. At the same time, the core should contribute to the ball having a soft and comfortable feel. The cores should not be overly stiff and the ball should be relatively easy to control. Having a ball that plays well with good spin is particularly important when making approach shots near the golf green. The golfer is better able to control their shots with such balls. The cores of this invention typically have a COR of about 0.75 or greater; and preferably about 0.80 or greater. The compression of the core preferably is about 50 to about 130 and more preferably in the range of about 70 to about 110.

The rubber composition containing the nanostructures is relatively stiff having a relatively high flex modulus of 80,000 psi or greater. More particularly, the high modulus materials preferably have a modulus within the range having a lower limit of 80,000 or 90,000 or 100,000 or 110,000 or 120,000 or 130,000 or 140,000 or 150,000 psi and an upper limit of 200,000 or 300,000 or 400,000 or 500,000 or greater and a hardness of 40 Shore D or greater, or 50 Shore D or greater, or 60 Shore D or greater, or within a range having a lower limit of 40 or 50 or 60 Shore D and an upper limit of 80 or 90 or 100 Shore D.

In one embodiment, the core has a dual-layer construction including an inner layer (center) and surrounding outer layer. In one example, the inner core may be made of the nanostructure-containing rubber composition and the outer core layer may be made of the non-nanostructure-containing rubber composition. Alternatively, the inner core may be made of the nanostructure-containing rubber composition and the outer core layer may be made of the non-nanostructure-containing rubber composition. In this embodiment, the nanostructure-containing rubber composition is relatively stiff having a relatively high flex modulus of 90,000 psi or greater; while the non-nanostructure-containing rubber composition is relatively flexible having a relatively low flex modulus of 30,000 psi or less. The high modulus materials preferably have a modulus within the range having a lower limit of 30,000 or 40,000 or 50,000 or 80,000 or 130,000 or 150,000 psi and an upper limit of 160,000 or 200,000 or 300,000 or 400,000 or greater and a hardness of 40 Shore D or greater, or 50 Shore D or greater, or 60 Shore D or greater, or within a range having a lower limit of 40 or 50 or 60 Shore D and an upper limit of 80 or 90 or 100 Shore D. On the other hand, the low modulus materials may have a modulus with a lower limit of 1,000 or 5,000 or 10,000 or 15,000 or 20,000 or 25,000 or 30,000 psi and an upper limit of 40,000 or 45,000 or 50,000 or 60,000 or 70,000 or 80,000. The hardness of the low modulus material is generally 30 Shore D or greater; or 40 Shore D or greater; or 50 Shore D or greater, or preferably within a range having a lower limit of 30 or 40 or 50 Shore D and an upper limit of 60 or 70 or 80 or 85 Shore D. In a preferred embodiment, the modulus of the relatively high modulus material is at least 15% greater, or at least 20% greater, or at least 30% greater than the modulus of the relatively low modulus material.

By the term, "modulus" as used herein, it is meant flexural modulus which is the ratio of stress to strain within the elastic limit (when measured in the flexural mode) and is similar to tensile modulus. This property is used to indicate the bending stiffness of a material. The flexural modulus, which is a modulus of elasticity, is determined by calculating the slope of the linear portion of the stress-strain curve during the bending test. The formula used to calculate the flexural modulus from the recorded load (F) and deflection (D) is:

$$E_b = \frac{L^3 m}{4bd^3}$$

wherein,
$E_b$=modulus of elasticity in bending, MPa (psi)
L=span of specimen between supports, mm (in);
b=width of specimen tested, mm (in);
d=depth of specimen tested, mm (in.), and
m=slope of the tangent to the initial straight-line portion of the load deflection curve, N/mm (lbf/in.) of deflection.

If the slope of the stress-strain curve is relatively steep, the material has a relatively high flexural modulus meaning the material resists deformation. The material is more rigid. If the slope is relatively flat, the material has a relatively low flexural modulus meaning the material is more easily deformed.

The material is more flexible. Flexural modulus can be determined in accordance with ASTM D-790 standard among other testing procedures.

The polybutadiene rubber (base rubber) may be blended with other elastomers to form the rubber material in accordance with this invention. Other elastomers include, but are not limited to, polybutadiene, polyisoprene, ethylene propylene rubber ("EPR"), styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

To form the core structure for the golf ball, the polybutadiene rubber is used generally in an amount of at least about 5% by weight based on total weight of composition and is generally present in an amount of about 5% to about 100%, or an amount within a range having a lower limit of 5% or 10% or 20% or 30% or 40% or 50% and an upper limit of 55% or 60% or 70% or 80% or 90% or 95% or 100%. In general, the concentration of polybutadiene rubber is about 45 to about 95 weight percent. Preferably, the rubber material used to form the core layer comprises at least 50% by weight, and more preferably at least 70% by weight, polybutadiene rubber.

The polybutadiene rubber may have a relatively high or low Mooney viscosity. A "Mooney unit" is an arbitrary unit used to measure the viscosity of raw or unvulcanized rubber. In the present invention, the Mooney viscosity is measured in accordance with "Standard Test Methods for Rubber-Viscosity, Stress Relaxation, and Pre-Vulcanization Characteristics (Mooney Viscometer)" of ASTM D1646-07. In general, polybutadiene rubbers of higher molecular weight and higher Mooney viscosity have better resiliency than polybutadiene rubbers of lower molecular weight and lower Mooney viscosity. However, as the Mooney viscosity increases, the milling and processing of the polybutadiene rubber generally becomes more difficult. Blends of high and low Mooney viscosity polybutadiene rubbers may be prepared as is described in Voorheis et al., U.S. Pat. Nos. 6,982,301 and 6,774,187, the disclosures of which are hereby incorporated by reference, and used in accordance with the present invention. In general, the lower limit of Mooney viscosity may be 30 or 35 or 40 or 45 or 50 or 55 or 60 or 70 or 75 and the upper limit may be 80 or 85 or 90 or 95 or 100 or 105 or 110 or 115 or 120 or 125 or 130.

The rubber compositions of this invention may be cured, either by pre-blending or post-blending, using conventional curing processes. Suitable curing processes include, for example, peroxide-curing, sulfur-curing, high-energy radiation, and combinations thereof. Preferably, the rubber composition contains a free-radical initiator selected from organic peroxides, high energy radiation sources capable of generating free-radicals, and combinations thereof. In one preferred version, the rubber composition is peroxide-cured. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di (t-butylperoxy) hexane; di-t-butylperoxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel. Peroxide free-radical initiators are generally present in the rubber composition in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the total rubber. Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

The rubber compositions preferably include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, and nickel. In a particular embodiment, the co-agent is selected from zinc salts of acrylates, diacrylates, methacrylates, and dimethacrylates. In another particular embodiment, the agent is zinc diacrylate (ZDA). When the co-agent is zinc diacrylate and/or zinc dimethacrylate, the co-agent is typically included in the rubber composition in an amount within the range having a lower limit of 1 or 5 or 10 or 15 or 19 or 20 parts by weight per 100 parts of the total rubber, and an upper limit of 24 or 25 or 30 or 35 or 40 or 45 or 50 or 60 parts by weight per 100 parts of the base rubber.

Radical scavengers such as a halogenated organosulfur or metal salt thereof, organic disulfide, or inorganic disulfide compounds may be added to the rubber composition. These compounds also may function as "soft and fast agents." As used herein, "soft and fast agent" means any compound or a blend thereof that is capable of making a core: 1) softer (having a lower compression) at a constant "coefficient of restitution" (COR); and/or 2) faster (having a higher COR at equal compression), when compared to a core equivalently prepared without a soft and fast agent. Preferred halogenated organosulfur compounds include, but are not limited to, pentachlorothiophenol (PCTP) and salts of PCTP such as zinc pentachlorothiophenol (ZnPCTP). Using PCTP and ZnPCTP in golf ball inner cores helps produce softer and faster inner cores. The PCTP and ZnPCTP compounds help increase the resiliency and the coefficient of restitution of the core. In a particular embodiment, the soft and fast agent is selected from ZnPCTP, PCTP, ditolyl disulfide, diphenyl disulfide, dixylyl disulfide, 2-nitroresorcinol, and combinations thereof.

The rubber compositions of the present invention also may include "fillers," which are added to adjust the density and/or specific gravity of the material. Suitable fillers include, but are not limited to, polymeric or mineral fillers, metal fillers, metal alloy fillers, metal oxide fillers and carbonaceous fillers. The fillers can be in any suitable form including, but not limited to, flakes, fibers, whiskers, fibrils, plates, particles, and powders. Rubber regrind, which is ground, recycled rubber material (for example, ground to about 30 mesh particle size) obtained from discarded rubber golf ball cores, also can be used as a filler. The amount and type of fillers utilized are governed by the amount and weight of other ingredients in the golf ball, since a maximum golf ball weight of 45.93 g (1.62 ounces) has been established by the United States Golf Association (USGA).

As discussed above, in one preferred version, the golf ball contains a dual-core comprising an inner core (center) and surrounding outer core layer. In one embodiment, the specific gravity of the center is preferably less than or equal to or substantially the same as the specific gravity of the outer core layer. For purposes of the present invention, specific gravities are substantially the same if they are the same or within 0.1 g/cc of each other. Preferably, the center has a specific gravity within a range having a lower limit of 0.50 or 0.90 or 1.05 or 1.13 g/cc and an upper limit of 1.15 or 1.18 or 1.20 g/cc. The outer core layer preferably has a specific gravity of 1.00 g/cc or greater, or 1.05 g/cc or greater, or 1.10 g/cc or greater. In one embodiment, the outer core has a specific gravity in the range of about 1.00 to about 1.18 g/cc. As discussed further below, if an intermediate core layer is present, it preferably has a specific gravity of 1.00 g/cc or greater, or 1.05 g/cc or greater, or 1.10 g/cc or greater. In a particularly preferred embodiment, the specific gravities of the center and outer core layer are substantially the same. In another particularly preferred embodiment, the specific gravities of the intermediate layer and outer core layer are substantially the same.

Suitable polymeric or mineral fillers that may be added to the rubber composition include, for example, precipitated hydrated silica, clay, talc, asbestos, glass fibers, aramid fibers, mica, calcium metasilicate, barium sulfate, zinc sulfide, lithopone, silicates, silicon carbide, tungsten carbide, diatomaceous earth, polyvinyl chloride, carbonates such as calcium carbonate and magnesium carbonate. Suitable metal fillers include titanium, tungsten, aluminum, bismuth, nickel, molybdenum, iron, lead, copper, boron, cobalt, beryllium, zinc, and tin. Suitable metal alloys include steel, brass, bronze, boron carbide whiskers, and tungsten carbide whiskers. Suitable metal oxide fillers include zinc oxide, iron oxide, aluminum oxide, titanium oxide, magnesium oxide, and zirconium oxide. Suitable particulate carbonaceous fillers include graphite, carbon black, cotton flock, natural bitumen, cellulose flock, and leather fiber. Micro balloon fillers such as glass and ceramic, and fly ash fillers can also be used. In a particular aspect of this embodiment, the rubber composition includes filler(s) selected from carbon black, nanoclays (e.g., Cloisite® and Nanofil® nanoclays, commercially available from Southern Clay Products, Inc., and Nanomax® and Nanomer® nanoclays, commercially available from Nanocor, Inc.), talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof. In a particular embodiment, the rubber composition is modified with organic fiber micropulp, as disclosed, for example, in Chen, U.S. Pat. No. 7,504,448, the entire disclosure of which is hereby incorporated by reference.

In the present invention, the above-described fillers are distinguishable over the above-described nanostructures based, at least in part, on the dimensions of the respective materials. Particularly, the nanostructures have nanometer-sized dimensions; for example, the nanoparticles preferably have an average particle size of less than 100 nm. In contrast, the fillers described above are larger than nanometer-sized. For example, if such fillers were in the form of particles, they would have an average particle size greater than nanometer-sized. The average particle size of the fillers will depend upon desired effect, cost, and ease of addition.

In addition, the rubber compositions may include antioxidants to prevent the breakdown of the elastomers. Also, processing aids such as high molecular weight organic acids and salts thereof, may be added to the composition. In a particular embodiment, the total amount of additive(s) and filler(s) present in the rubber composition is 15 wt % or less, or 12 wt % or less, or wt % or less, or 9 wt % or less, or 6 wt % or less, or 5 wt % or less, or 4 wt % or less, or 3 wt % or less, based on the total weight of the rubber composition.

Other polymers that may be included in the rubber composition include, for example, ethylene acid copolymer ionomers; polyesters; polyamides; polyamide-ethers, polyamide-esters; polyurethanes, polyureas; fluoropolymers; polystyrenes; polypropylenes and polyethylenes; polyvinyl chlorides; polyvinyl acetates; polycarbonates; polyvinyl alcohols; polyethers; polyimides, polyetherketones, polyamideimides; and mixtures thereof.

Core Structure

As discussed above, the core may have a dual-layered or multi-layered structure. In one preferred embodiment, the inner core has a center hardness (CH) within a range having a lower limit of about 38 or 45 or 52 and an upper limit of about 55 or 60 or 62 Shore D. Meanwhile, if the intermediate core layer is present, it preferably has a surface hardness (ICLSH) within a range having a lower limit of about 46 or 50 or 54 Shore D and an upper limit of about 60 or 64 or 68 Shore D. The outer core layer preferably has a surface hardness (OCLSH) within a range having a lower limit of about 40 or 44 or 48 or 52 Shore D and an upper limit of about 56 or 60 or 64 Shore D. In one embodiment, the surface hardness of the intermediate core layer is greater than the center hardness of the inner core and surface hardness of the outer core layer. In an alternative embodiment, the surface hardness of the intermediate core layer is less than the center hardness of the inner core and surface hardness of the outer core layer.

In one preferred golf ball, the inner core (center) has a "positive" hardness gradient (that is, the outer surface of the inner core is harder than its geometric center) and the outer core layer has a "positive" hardness gradient (that is, the outer surface of the outer core layer is harder than the inner surface of the outer core layer.) In such cases where both the inner core and outer core layer have "positive" hardness gradients, the outer surface hardness of the outer core layer is preferably greater than the material hardness of the inner core (center). In an alternative version, the inner core may have a "negative" hardness gradient (that is, the outer surface of the outer core layer is softer than the inner surface of the outer core layer.) and the outer core may have a positive hardness gradient. In another version, the inner core (center) has a positive hardness gradient, while the outer core layer has a negative hardness gradient In yet another version, the outer core layer may have a "zero" hardness gradient. (That is, the hardness values of the outer surface of the outer core layer and the inner surface of the outer core layer are substantially the same.) Such hardness gradients are further described in Bulpett et al., U.S. Pat. Nos. 7,537,529 and 7,410,429 and Sullivan et al., U.S. Pat. Nos. 7,255,656 and 6,852,044, the disclosures of which are hereby incorporated by reference.

Particularly, the term, "zero hardness gradient" as used herein, means a surface to center (or second surface) Shore C hardness gradient of less than 8, preferably less than 5 and most preferably less than 3 and may have a value of zero or negative 1 to negative 25. The term, "negative hardness gradient" as used herein, means a surface to center (or second surface) Shore C hardness gradient of less than zero. The terms, "zero hardness gradient" and "negative hardness gradient," may be used herein interchangeably to refer to hardness gradients of negative 1 to negative 25. The term, "positive hardness gradient" as used herein, means a surface to center (or second surface) Shore C hardness gradient of 8 or greater, preferably 10 or greater, and most preferably 20 or greater. By the term, "steep positive hardness gradient" as used herein, it is meant surface to center (or second surface) Shore C hardness gradient of 20 or greater, more preferably 25 or greater, and most preferably 30 or greater. For example, the core may have a steep positive hardness gradient of 35, 40, or 45 Shore C or greater.

Preferably, the hardness gradient from geometric center of the inner core to the surface of the outer core layer is a positive hardness gradient. That is, the outer surface of the outer core layer is harder than the center of the inner core. Methods for measuring the hardness of the core and cover layers and determining the hardness gradients are discussed in further detail below.

Cover Structure

The golf ball cores of this invention may be enclosed with one or more cover layers. A wide variety of materials may be used for forming the outer cover including, for example, polyurethanes; polyureas; copolymers, blends and hybrids of polyurethane and polyurea; ethylene acid copolymer ionomer resins (for example, Surlyn® ionomer resins and HPF® 1000 and HPF® 2000, commercially available from DuPont; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc; cross-linked trans-polyisoprene and blends thereof; polyester-based thermoplastic elastomers, such as Hytrel®, commercially available from DuPont; polyurethane-based thermoplastic elastomers, such as Elastollan®, commercially available from BASF; synthetic or natural vulcanized rubber; and combinations thereof. Castable polyurethanes, polyureas, and hybrids of polyurethanes-polyureas are particularly desirable because these materials can be used to help make a golf ball having high resiliency and a soft feel. By the term, "hybrids of polyurethane and polyurea," it is meant to include copolymers and blends thereof.

Polyurethanes, polyureas, and blends, copolymers, and hybrids of polyurethane/polyurea are also particularly suitable for forming cover layers. When used as cover layer materials, polyurethanes and polyureas can be thermoset or thermoplastic. Thermoset materials can be formed into golf ball layers by conventional casting or reaction injection molding techniques. Thermoplastic materials can be formed into golf ball layers by conventional compression or injection molding techniques.

In one preferred embodiment, the ball includes a dual-cover comprising inner and outer cover layers. The inner cover layer is preferably formed from a composition comprising an ionomer or a blend of two or more ionomers that helps impart hardness to the ball. The inner cover layer preferably has a material hardness of 95 Shore C or less, or less than 95 Shore C, or 92 Shore C or less, or 90 Shore C or less, or a material hardness within a range having a lower limit of 60 or 65 or 70 or 75 or 80 or 84 or 85 Shore C and an upper limit of 90 or 92 or 95 Shore C. The thickness of the inner cover layer is preferably within a range having a lower limit of 0.010 or 0.015 or 0.020 or 0.030 inches and an upper limit of 0.035 or 0.045 or 0.080 or 0.120 inches. The outer cover layer preferably has a material hardness of 85 Shore C or less. The thickness of the outer cover layer is preferably within a range having a lower limit of 0.010 or 0.015 or 0.025 inches and an upper limit of 0.035 or 0.040 or 0.055 or 0.080 inches.

In a particular embodiment, the inner cover layer is formed from a composition comprising a high acid ionomer. A particularly suitable high acid ionomer is Surlyn 8150® (DuPont). Surlyn 8150® is a copolymer of ethylene and methacrylic acid, having an acid content of 19 wt %, which is 45% neutralized with sodium. In another particular embodiment, the inner cover layer is formed from a composition comprising a high acid ionomer and a maleic anhydride-grafted non-ionomeric polymer. A particularly suitable maleic anhydride-grafted polymer is Fusabond 525D® (DuPont), which is a maleic anhydride-grafted, metallocene-catalyzed ethylene-butene copolymer having about 0.9 wt % maleic anhydride grafted onto the copolymer. A particularly preferred blend of high acid ionomer and maleic anhydride-grafted polymer is a 84 wt %/16 wt % blend of Surlyn 8150® and Fusabond 525D®. Blends of high acid ionomers with maleic anhydride-grafted polymers are further disclosed, for example, in U.S. Pat. Nos. 6,992,135 and 6,677,401, the entire disclosures of which are hereby incorporated herein by reference.

In one embodiment, the inner cover layer is fanned from a composition comprising a 50/45/5 blend of Surlyn® 8940/Surlyn® 9650/Nucrel® 960, and, in a particularly preferred embodiment, has a material hardness of from 80 to 85 Shore C. In another particular embodiment, the inner cover layer is formed from a composition comprising a 50/25/25 blend of Surlyn® 8940/Surlyn® 9650/Surlyn® 9910, preferably having a material hardness of about 90 Shore C. In another version, a blend of 50% Surlyn® 7940 and 50% Surlyn® 8940 is used to form the inner cover. In yet another particular embodiment, the inner cover layer is preferably formed from a composition comprising a 50/50 blend of Surlyn® 8940/Surlyn® 9650, preferably having a material hardness of about 86 Shore C. Surlyn® 8940 is an ethylene/methacrylic acid copolymer in which the MAA acid groups have been partially neutralized with sodium ions. Surlyn® 9650 and Surlyn® 9910 are two different grades of ethylene/methacrylic acid copolymer in which the MAA acid groups have been partially neutralized with zinc ions. Surlyn® 7940 is a copolymer of about 85% ethylene and 15% methacrylic acid that has been neutralized with lithium ions. Nucrel® 960 is an ethylene/methacrylic acid copolymer resin nominally made with 15 wt % methacrylic acid, and available from DuPont.

As discussed above, the dual-core of the golf ball may be enclosed with a single-layered or multi-layered covers. In one embodiment, a single-layered cover having a thickness in the range of about 0.015 to about 0.090 inches, more preferably about 0.030 to about 0.070 inches, is formed. The cover has a hardness of about Shore D 80 or less, more preferably 70 or less, and most preferably about 60 or less. In another embodiment, a multi-layered cover comprising inner and outer cover layers is formed, where the inner cover layer has a thickness of about 0.01 inches to about 0.06 inches, more preferably about 0.015 inches to about 0.040 inches, and most preferably about 0.02 inches to about 0.035 inches. In this version, the inner cover layer is formed from a partially- or fully-neutralized ionomer having a Shore D hardness of greater than about 55, more preferably greater than about 60, and most preferably greater than about 65. The outer cover layer, in this embodiment, preferably has a thickness of about 0.015 inches to about 0.055 inches, more preferably about 0.02 inches to about 0.04 inches, and most preferably about 0.025 inches to about 0.035 inches, with a hardness of about Shore D 80 or less, more preferably 70 or less, and most preferably about 60 or less. The inner cover layer is harder than the outer cover layer in this version. A preferred outer cover layer is a castable or reaction injection molded polyurethane, polyurea or copolymer, blend, or hybrid thereof having a Shore D hardness of about 40 to about 50. In another multi-layer cover, dual-core embodiment, the outer cover and inner cover layer materials and thickness are the same but, the hardness range is reversed, that is, the outer cover layer is harder than the inner cover layer.

Manufacturing of Golf Ball Components

As discussed above, the compositions of this invention may be used to form a core for any suitable ball construction, including, for example, two-piece, three-piece, four-piece, and five-piece designs.

The core and cover compositions may be prepared using conventional mixing techniques. The core composition can be formed into an inner core structure by ordinary techniques such as, for example, injection or compression molding. After molding, the core structure is removed from the mold and its surface may be treated using techniques such as corona discharge, sand blasting, or grinding to improve adhesion of the surrounding layers. Injection molding or compression molding can be used to form an outer core layer and inner cover layer about the inner core to produce an intermediate golf ball. The cover layer(s) is subsequently molded over the inner/outer core to produce a final golf ball.

In compression molding, the outer core and/or inner cover composition is formed into smooth surfaced hemispherical shells which are then positioned around the inner core in a mold having the desired inner cover thickness and subjected to compression molding under heat followed by cooling. This process fuses the shells together to form a unitary intermediate ball. Alternatively, the intermediate balls may be produced by injection molding, wherein the outer core and/or inner cover layer is injected directly around the core placed at the center of an intermediate ball mold under heat and pressure. After molding, the golf balls produced may undergo various further processing steps such as buffing, painting and marking using conventional techniques to produce a finished ball.

Figure 2:
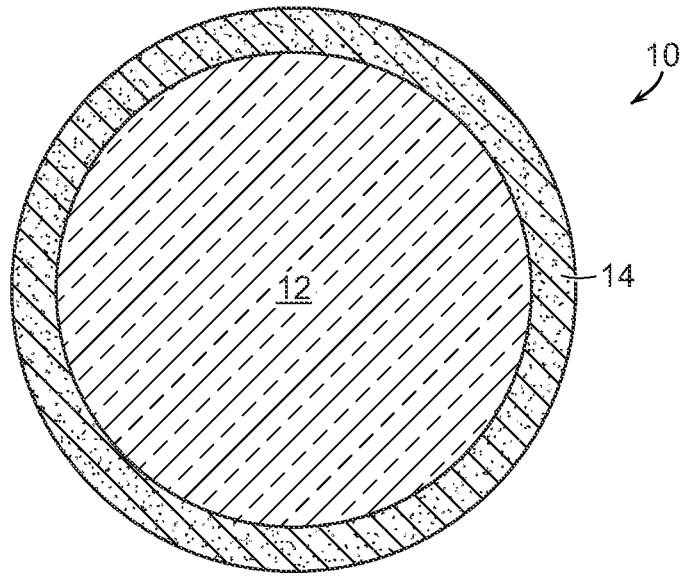
FIG. 2 is a cross-sectional view of a two-piece golf ball made in accordance with the present invention.
Figure 3:
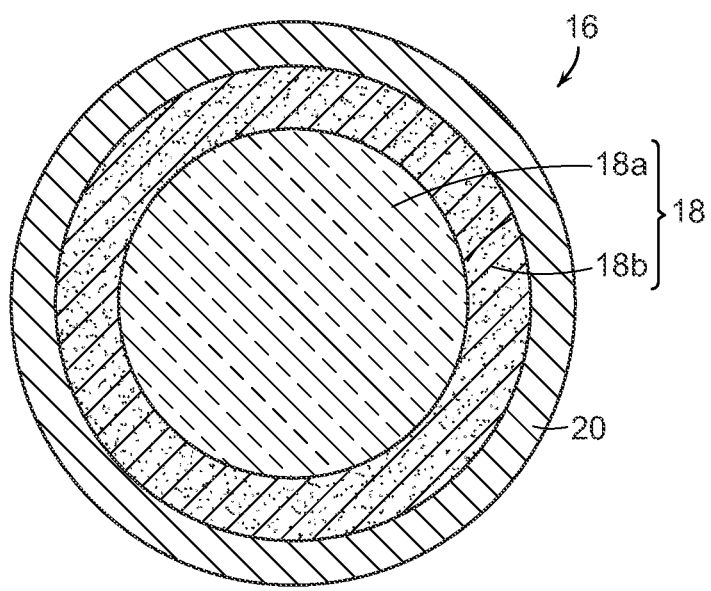
FIG. 3 is a cross-sectional view of a three-piece golf ball having an inner core and a dual-cover comprising inner and outer cover layers made in accordance with the present invention.
Figure 4:
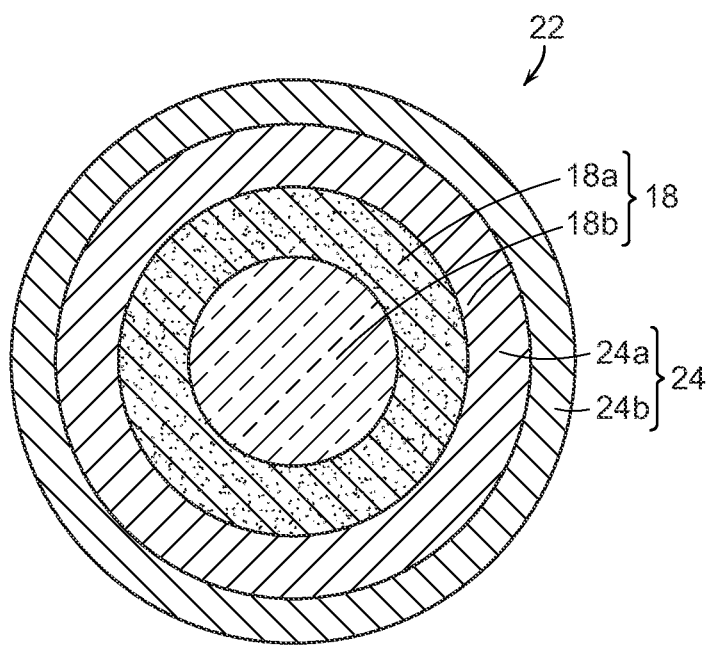
FIG. 4 is a cross-sectional view of a four-piece golf ball having a dual-core comprising an inner core and outer core layer and dual-cover comprising inner and outer cover layers made in accordance with the present invention.

Referring to FIG. 1, a front view of a finished golf ball that can be made in accordance with this invention is generally indicated at (6). The ball (6) includes a cover having a dimpled surface. The dimples (8) may have various shapes and be arranged in various patterns to modify the aerodynamic properties of the ball as needed. In FIG. 2, a two-piece golf ball (10) having a solid inner core (12) and a single-layered cover (14) is shown. The inner core (12) is made of the polybutadiene rubber/nanostructure composition as described above. The cover (14) may be made of any suitable thermoplastic or thermoset cover material such as, for example, polyurethane or polyurea, as described above. FIG. 3 shows a three-piece golf ball (16) that can be made in accordance with this invention. The ball (16) contains a dual-core (18) having an inner core (center) (18a) and outer core layer (18b) surrounded by a single-layered cover (20). The inner core (18a) and/or outer core layer (18b) may be made of the polybutadiene rubber/nanostructure composition as described above. In FIG. 4, a golf ball (22) containing the above-described dual-core (18) is surrounded by a dual-cover (24) having an inner cover layer (24a) and outer cover layer (24b), It should be understood the golf balls shown in FIGS. 1-4 are for illustrative purposes only and not meant to be restrictive. Other golf ball constructions can be made in accordance with this invention.

For example, in addition to the core constructions as described above, the rubber/nanostructure composition of this invention may be used in any other layer of the golf ball including, but not limited to, the intermediate layer, inner cover, and/or outer cover. Because the rubber/nanostructure compositions may be used in any layer, the physical properties and playing performance of the ball may vary depending upon the layer of the ball that is formed from the composition. In another example, a golf ball containing an inner core (center); an intermediate core layer; and an outer core layer may be made. At least one of the core layers is made from the rubber/nanostructure composition as described above. In this multi-layered core construction, the center preferably has a diameter within a range having a lower limit of 0.100 or 0.125 or 0.250 inches or 0.300 and an upper limit of 0.375 or 0.400 or 0.500 or 0.750 or 1.00 or 1.25 or 1.40 or 1.60 inches. More preferably, the center has a diameter within a range of about 0.25 to about 1.40 inches. The intermediate core layer preferably has a thickness within a range having a lower limit of 0.050 or 0.100 or 0.150 or 0.200 inches and an upper limit of 0.300 or 0.350 or 0.400 or 0.500 inches. The outer core layer encloses the center and intermediate core layer structure such that the multi-layer core has an overall diameter within a range having a lower limit of 1.40 or 1.45 or 1.50 or 1.55 inches and an upper limit of 1.58 or 1.60 or 1.62 or 1.66 inches.

In this multi-layered core construction, the center preferably has an outer surface hardness of 70 Shore C or greater, more preferably a surface hardness of 80 Shore C or greater, and most preferably a surface hardness of 85 Shore C or greater. For example, the center may have an outer surface hardness within a range having a lower limit of 70 or 75 or 80 Shore C and an upper limit of 90 or 95 Shore C. The outer core layer preferably has an outer surface hardness that is less than that of the center and is preferably 50 Shore C or less; or 60 Shore C or less; or 70 Shore C or less; or 75 Shore C or less; or 80 Shore C or less. The intermediate layer preferably has an inner surface hardness greater than that of the center and outer core layer hardness values. Preferably, the intermediate layer has a surface hardness of 80 Shore C or greater.

Test Methods

Hardness. The center hardness of a core is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball subassembly is centered under the durometer indenter before a surface hardness reading is obtained. A calibrated, digital durometer, capable of reading to 0.1 hardness units is used for the hardness measurements. The digital durometer must be attached to, and its foot made parallel to, the base of an automatic stand. The weight on the durometer and attack rate conforms to ASTM D-2240.

In certain embodiments, a point or plurality of points measured along the "positive" or "negative" gradients may be above or below a line fit through the gradient and its outermost and innermost hardness values. In an alternative preferred embodiment, the hardest point along a particular steep "positive" or "negative" gradient may be higher than the value at the innermost portion of the inner core (the geometric center) or outer core layer (the inner surface)—as long as the outermost point (i.e., the outer surface of the inner core) is greater than (for "positive") or lower than (for "negative") the innermost point (i.e., the geometric center of the inner core or the inner surface of the outer core layer), such that the "positive" and "negative" gradients remain intact.

As discussed above, the direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined according to the test procedures provided above. The outer surface of the inner core layer (or other optional intermediate core layers) in a dual-core ball are also readily determined according to the procedures given herein for measuring the outer surface hardness of a golf ball layer, if the measurement is made prior to surrounding the layer with an additional core layer. Once an additional core layer surrounds a layer of interest, the hardness of the inner and outer surfaces of any inner or intermediate layers can be difficult to determine. Therefore, for purposes of the present invention, when the hardness of the inner or outer surface of a core layer is needed after the inner layer has been surrounded with another core layer, the test procedure described above for measuring a point located 1 mm from an interface is used.

Also, it should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. Shore hardness (for example, Shore C or Shore D hardness) was measured according to the test method ASTM D-2240.

When numerical lower limits and numerical upper limits are set forth herein, it is contemplated that any combination of these values may be used. Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention.

All patents, publications, test procedures, and other references cited herein, including priority documents, are fully incorporated by reference to the extent such disclosure is not inconsistent with this invention and for all jurisdictions in which such incorporation is permitted.

It is understood that the compositions and golf ball products described and illustrated herein represent only some embodiments of the invention. It is appreciated by those skilled in the art that various changes and additions can be made to compositions and products without departing from the spirit and scope of this invention. It is intended that all such embodiments be covered by the appended claims.

We claim:

1. A golf ball, comprising a core having at least one layer and a cover having at least one layer, the at least one layer of the core being formed a composition comprising;
   i) a rubber material, wherein the rubber material comprises about 5 to about 50% by weight modified polybutadiene rubber and about 50 to about 95% by weight non-modified polybutadiene rubber;
   ii) 0.1 to 5 parts by peroxide free-radical initiator;
   iii) 5 to 50 parts by weight cross-linking co-agent; and
   iv) 0.1 to 30 parts by weight of substantially oriented nanostructures, the nanostructures being selected from the group consisting nanofibers, nanorods, nanotubes, and nanoparticles, based on 100 parts of rubber material.

2. The golf ball of claim 1, wherein the nanostructures are nano-particles having an average particle size of 100 nm or less.

3. The golf ball of claim 1, wherein the modified polybutadiene rubber is formed by reacting the polybutadiene with a chemical modifier having chemical moieties selected from the group consisting of alkoxysilanes, three-membered heterocycles including oxiranes, azirdines and thioxiranes; carboxylic acids, esters and salts, alcohols, isocyanates, thiols, sulfides, and anhydrides.

4. The golf ball of claim 1, wherein the modified polybutadiene has a cis-content of at least 80%.

5. The golf ball of claim 4, wherein the modified polybutadiene has a cis-content of at least 90%.

6. The golf ball of claim 5, wherein the modified polybutadiene has a cis-content of at least 97%.

7. The golf ball of claim 1, wherein the cross-linking co-agent is selected from the group consisting of zinc acrylates and zinc methacrylates.

8. The golf ball of claim 1, wherein the rubber material further comprises 0.5 to 100 parts by weight of a non-nanometer-sized filler material.

9. The golf ball of claim 8, wherein the filler is selected from the group consisting of silica, clay, glass fibers, aramid fibers, mica, calcium metasilicate, zinc sulfate, zinc sulfide, barium sulfate, and carbon black and mixtures thereof.

10. The golf ball of claim 8, wherein the filler is selected from the group consisting of calcium carbonate, zinc carbonate, barium carbonate, and magnesium carbonate, and mixtures thereof.

11. The golf ball of claim 8, wherein the filler is selected from the group consisting of titanium., tungsten, aluminum, bismuth, nickel, molybdenium, iron, lead, copper, boron, cobalt, beryllium, zinc, tin, steel, brass, bronze, boron carbide, and tungsten carbide materials.

12. The golf ball of claim 8, wherein the filler is selected from the group consisting of zinc oxide, tin oxide, iron oxide, calcium oxide, aluminum oxide, and mixtures thereof.

13. The golf ball of claim 1, wherein the composition further comprises a halogenated organosulfur or metal salt thereof, an organic disulfide, or an inorganic disulfide compound.

14. The golf ball of claim 1, wherein the composition for the core layer further comprises a polymer selected from the group consisting of ethylene acid copolymer ionomers; polyesters; polyamides; polyamide-ethers, polyimide-esters; polyurethanes, polyureas;

fluoropolymers; polystyrenes; polypropylenes and polyethylenes; polyvinyl chlorides; polyvinyl acetates; polycarbonates; polyvinyl alcohols; polyethers; polyimides, polyetherketones, polyamideimides; and mixtures thereof.

15. The golf ball of claim 1, wherein the cover is a single layer having a thickness of about 0.015 to about 0.090 inches and is formed from a thermoplastic or thermoset material.

16. The golf ball of claim 1, wherein the cover comprises two or more layers and has an overall thickness of about 0.020 to about 0.210 inches and wherein each cover layer is formed from a thermoplastic or thermoset material.

17. The golf ball of claim 16, wherein the inner cover is formed of an ionomer resin comprising an ethylene acid copolymer and the outer cover is formed of a polyurethane composition.

* * * * *